United States Patent

Zall et al.

[11] 4,061,504
[45] Dec. 6, 1977

[54] APPARATUS FOR CLEANING AUTOMATIC MILKING MACHINES

[75] Inventors: Robert R. Zall, Ithaca; A. Theodore Sobel, Brooktondale; Donald R. Price, Ithaca, all of N.Y.

[73] Assignee: Cornell Research Foundation, Inc., Ithaca, N.Y.

[21] Appl. No.: 688,569

[22] Filed: May 21, 1976

[51] Int. Cl.² .............................. A01J 7/00; B08B 9/10
[52] U.S. Cl. .................................... 134/95; 119/14.18;
134/10; 134/30; 134/98; 134/103; 134/107;
137/240
[58] Field of Search .................... 134/10, 22 R, 22 C,
134/29, 30, 95, 98, 103, 107, 108; 137/15, 240;
119/14.18

[56] References Cited

U.S. PATENT DOCUMENTS

| 2,558,628 | 6/1951 | Redin | 134/22 C X |
| 2,915,072 | 12/1959 | Merritt | 134/95 X |
| 3,278,961 | 10/1966 | Svensson | 134/95 X |

Primary Examiner—Richard V. Fisher
Attorney, Agent, or Firm—Lawrence E. Laubscher; Ralph R. Barnard; Theodore C. Wood

[57] ABSTRACT

A cleaning apparatus for automatic milking machines of the Clean-In-Place (CIP) type in which pre-rinse liquid and reused cleaning solutions are maintained at a temperature within 50° F. - 120° F. A vacuum pump and a liquid pump along with the operation of various valves enable the passage of the pre-rinse liquid and cleaning solution through the milking machine. An insulated storage receptacle with a heater maintains recovered cleaning solution at the desired temperature for reuse.

1 Claim, 1 Drawing Figure

CIP SYSTEM WITH DETERGENT RECYCLE

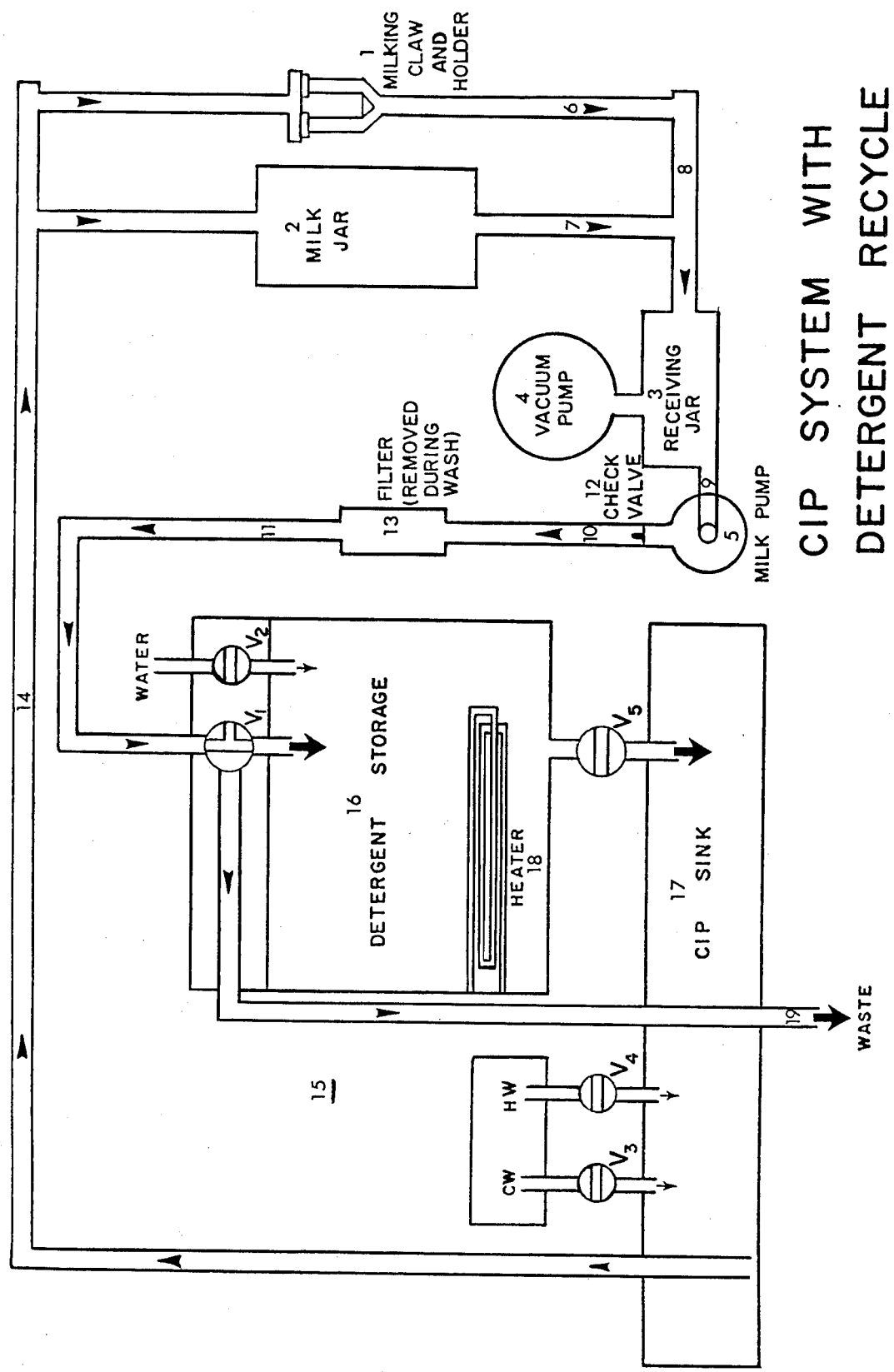

APPARATUS FOR CLEANING AUTOMATIC MILKING MACHINES

BACKGROUND OF THE INVENTION

Energy resources are finally being recognized as finite. Temporary shortages have already surfaced. On-the-farm energy consumption is small (2%-4%) compared to the total U.S. use. Nonetheless, energy conservation in all segments is important and the accumulation of savings can have a significant effect on energy use. While food production must be considered a priority use of energy resources, there is a need to operate as efficiently as possible.

The energy consumed on dairy farms for cleaning the milking system is a major component of the total energy use. New designs in parlors, CIP systems, and demands from inspectors for better sanitation in general have resulted in increased consumption of hot water, detergents and sanitizing agents.

On dairy farms that use electric water heaters, approximately ¼ of the electrical power consumed is for heating water. Improved efficiency in cleaning milking equipment could, therefore, result in substantial savings in energy. Dairy farms are continually increasing in size and the economic benefits associated with salvaging water and cleaning supplies for reuse are becoming significant.

Various systems of the CIP type for automatic milking machines have previously been described, e.g., U.S. Pat. No. 2,558,628 issued to Redin, 2,717,576 issued to Hansen, and U.S. Pat. No. 3,728,157 issued to Griparis. In such previously described machines it has been common practice to (1) employ high temperature prerinse and cleaning solutions, and (2) discharge the cleaning solution following the cleaning cycle into the environment. That previous practice apparently assumed that high temperature prerinse and cleaning solutions and the use of a fresh cleaning solution for each cleaning cycle would eliminate harmful residual bacteria. It was recently discovered that contrary to those assumptions, the pre-rinse and reconstituted and recycled cleaning solution when maintained at a temperature of 50° F – 120° F, not only improves cleaning of the system and reduces the quantity of harmful bacteria, but also results in energy savings, reduction in environmental pollution, and a reduction in cost of cleaning agents, as well as water consumption.

SUMMARY OF THE INVENTION

In accordance with the principles of this invention, a cleaning method and apparatus is provided for automatic milking machines of the CIP type wherein a cleaning solution holding tank stores the solution at a pre-determined temperature and the solution is reconstituted before reuse.

A feature of this invention is that when the cleaning solution is stored and reconstituted before reuse, and that solution as well as the pre-rinse are maintained within 50° F and 120° F, a substantial saving in energy and improved cleaning results.

Another feature of the invention is that cleaning solutions are stored for reuse in an insulated container thereby preserving the heat energy.

BRIEF DESCRIPTION OF THE DRAWINGS

The single FIGURE of the drawing is in schematic form and illustrates a CIP system for automatic milking machines constructed in accordance with the principles of this invention.

DETAILED DESCRIPTION

Referring now to the drawing, there is illustrated in schematic form, a milking claw and holder 1, a milk weigh jar 2, a receiving jar 3, a vacuum pump 4, and a milk pump 5. During the normal milking operation, the milking claw is attached to the cow and milk flows through the milk lines 6, 7 and the connecting portion of main line 8 to the milk weigh jar 2. Following that milking operation, the milk from milk weigh jar 2 is transferred to the receiving jar 3. That milking operation may be repeated for each of several cows. It will be understood that it is common practice for an automatic milking machine to have many milking claw and holder units and many milk weigh jars similarly connected to the main line 8 so that several cows can be milked simultaneously. When the milk level in receiving jar 3 is above a pre-determined level, the milk pump 5 transfers the milk through lines 10, 11 by way of check valve 12 and filter 13 to a bulk storage tank not shown. As shown in the drawing, the milk pump 5 is connected to the receiving jar 3 by line 9.

A customary milking operation as thus far described, usually takes about 1 to 3 hours (about 75 to 300 cows). The time between successive milking operations may be about 8 to 12 hours since cows are ususally milked twice a day. If milk residue is allowed to remain in the various units and milk lines of the system between milking operations, bacteria growth could present serious health hazards. Following each major milking operation, it has become common practice to employ a CIP line 14 which is connected to the milk weigh jar 2 and milking claw and holder 1 and through that line has been transmitted in succession a hot pre-rinse liquid, a hot cleaning solution, and a cold post-rinse liquid. The pre-rinse, the cleaning solution and the post-rinse passes through all of the milking system units and milk lines to remove milk residue and thereby avoid a favorable condition for bacteria growth.

Such previous CIP systems have used water or chemically treated water for pre-rinse which is heated to about 110° F. Since most CIP lines and milk lines form a closed loop which is many feet in length and are uninsulated, that 110° F pre-rinse is frequently about 105° F when effecting the rinsing function. Similarly, it has been common practice to heat the cleaning solution to about 170° F and this solution also is about 105° F when effecting its cleaning function. The time required to complete the pre-rinse and cleaning phases of the CIP cycle is sufficiently long that the hard to clean areas are maintained at a temperature of about 105° F thereby promoting bacteria growth. It has also been common practice in such previous CIP systems to discharge into the environment the cleaning solution when the cleaning phase is completed.

In accordance with this invention, a CIP unit 15 includes a cleaning solution store (i.e., storage receptacle) 16, a sink (or container) 17, a source of cold water (CW), a source of hot water (HW), and control valves $V_1$ through $V_5$. The cleaning solution store 16 is preferably of the insulated type to preserve the temperature of liquid stored therein and further includes a heating unit 18 to permit maintenance of the cleaning solution at the desired temperature.

The operation of the CIP unit is to perform a complete cleaning operation of the automatic milking machine parts having milk residue therein as follows:

1. Cleaning solution is placed in the store 16 and heater 18 energized, if necessary, to bring the solution to a temperature of between 50° F and 120° F;
2. Valves $V_3$ and $V_4$ are opened and the flow rate of hot and cold water is suitably controlled to fill the sink 17 with pre-rinse at a temperature between 50° F and 120° F;
3. Diverter valve $V_1$ is operated to the positon where liquid from CIP return line 11 passes to waste line 19;
4. Vacuum pump 4 is operated to create a vacuum in main milk line 8, milk weigh jar/s 2, milk claw and holder/s 1 and CIP line 14. The vacuum thus causes the pre-rinse in the sink 17 to pass through the system to the waste line 19 (the milk pump 5 automatically emptying receiving jar 3).
5. Diverter valve $V_1$ is operated to allow liquid from return line 11 to enter store 16 and valve 5 is operated to pass liquid from store 16 to sink 17;
6. When sink 17 contains a desired quantity of cleaning solution, the vacuum pump 4 again causes the contents of the sink to pass through the system until the desired number of passes through the loop have been made.
7. Valve $V_5$ is closed so that the cleaning solution is returned to the store for subsequent re-use;
8. Valve $V_3$ is opened to fill the sink to the desired level with cold post-rinse and diverter valve $V_1$ is operated to permit liquid from return line 11 to flow to waste line 19;
9. Vacuum pump 4 again causes the contents of the sink to pass through the system.

If desired, an automatic control system may be provided to cause valves $V_1$ through $V_5$ to be operated in the above noted sequence with the desired timing. As shown in the drawing, water may be introduced to the cleaning solution in the detergent storage 16 by operation of valve $V_2$.

Experiments have been conducted in a milking parlor of the double-ten herringbone type in which one side employed the cleaning system according to this invention and the other side employed a conventional CIP system. About 200 cows were milked twice a day for several days on each side of the parlor. The required concentration of cleaning solution on both sides of the parlor was obtained using one pound of a standard commercial detergent. On the side employing this invention 1¼ ounces of detergent were added after each milking operation was completed. Microbial counts were made on each side at various hard-to-clean points in the system as well as in the final rinse water. There was no significant difference in microbial count in the final rinse water of the two dies of the parlor. However, hard-to-clean parts on the side employing this invention, such as the float in the receiving jar showed a marked decrease in microbial count.

What is claimed is:
1. A clean-in-place system for cleaning a component of an automatic milking machine, comprising
    a. a container (17);
    b. means including first valve means (V3, V4) for supplying to said container a quantity of prerinsing liquid having a temperature of between 50° F and 120° F;
    c. an insulated storage receptacle (16) for containing a quantity of a cleaning solution;
    d. heater means (18) arranged in said storage receptacle for maintaining said cleaning solution at a temperature of between 50° F. and 120° F.;
    e. means including second valve means ($V_5$) for supplying the cleaning solution from said storage receptacle to said container;
    f. first conduit means (14) connected at one end with said container and being adapted for connection at its other end with one end of said milking machine component;
    g. two-position diverter valve means ($V_1$) having an inlet, a first outlet connected solely with said storage receptacle, and a second outlet connected with waste, said diverter valve means being operable between first and second positions to alternately connect the inlet thereof with said first and second outlets, respectively;
    h. liquid pump means (5) having an inlet adapted for connection with the other end of said milking machine component, and an outlet connected with the inlet of said diverter valve means; and
    i. vacuum pump means (4) connected with the inlet of said pump means;
    j. said vacuum pump means being initially operable—when said first valve means are open, second valve means are closed and said diverter valve is in its second position—for drawing pre-rinsing liquid from said container through said component to the inlet of said pump means, said liquid pump means being operable to discharge the used pre-rinsing liquid to waste, said vacuum pump and liquid pump means then being operable—when said first valve means are closed, said second means is open, and said diverter valve is in its first position—for drawing the cleaning solution from said storage receptacle through the component via said container and for discharging the used cleaning solution into said storage receptacle, said liquid pump means and said vacuum pump means being subsequently operable—when said first valve means is open, said second valve means is closed, and said diverter valve means is in its second position—to refill said container with a quantity of clean rinsing liquid, to draw the rinsing liquid through said component, and to discharge the used rinsing liquid to waste.

* * * * *